United States Patent [19]
Saito et al.

[11] Patent Number: 5,770,333
[45] Date of Patent: Jun. 23, 1998

[54] NONAQUEOUS SECONDARY BATTERY AND NEGATIVE ELECTRODE MATERIAL THEREFOR

[75] Inventors: Akihiko Saito; Yasuhisa Aono; Tatsuo Horiba; Hideyo Kodama; Toshinori Dozono; Masahisa Inagaki, all of Hitachi, Japan

[73] Assignee: Hitachi, Ltd., Tokyo, Japan

[21] Appl. No.: 660,764

[22] Filed: Jun. 10, 1996

[30] Foreign Application Priority Data

Jun. 12, 1995 [JP] Japan .................................. 7-144780
May 29, 1996 [JP] Japan .................................. 8-134672

[51] Int. Cl.[6] .................................................. H01M 4/58
[52] U.S. Cl. ........................ 429/194; 429/218; 252/182.1
[58] Field of Search .................................. 429/194, 218; 423/299, 324; 252/182.1

[56] References Cited

U.S. PATENT DOCUMENTS 4,002,492  1/1977  Rao ........................................ 429/194
5,294,503  3/1994  Huang et al. ........................... 429/194

Primary Examiner—Anthony Skapars
Attorney, Agent, or Firm—Antonelli, Terry, Stout & Kraus, LLP

[57] ABSTRACT

A non-aqueous secondary battery having a long life-time and a high capacity density is provided by increasing the discharging capacity of the negative electrode and extending the life-time of the negative electrode. The nonaqueous secondary battery has a positive electrode and a negative electrode reversibly absorbing and discharging an alkaline metal and a nonaqueous electrolyte, wherein the negative electrode is made of an inter-metallic compound containing at least one element selected from the group consisting of 4A group elements, P and Sb, the inter-metallic compound has any one of $CaF_2$ type, ZnS type and AlLiSi type crystal structures, and the $CaF_2$ type structure is any one an inverse-fluorite structure and a fluorite structure having a lattice constant larger than 6.36 Å.

24 Claims, 8 Drawing Sheets

NONAQUEOUS SECONDARY BATTERY AND NEGATIVE ELECTRODE MATERIAL THEREFOR

BACKGROUND OF THE INVENTION

The present invention relates to a nonaqueous secondary battery and, more particularly, to a long life-time and high energy-density nonaqueous secondary battery and a negative electrode material therefor suitable for use in a portable device power source.

A nonaqueous secondary battery comprises a negative electrode made of an alkaline metal having a low ionization potential. Such a nonaqueous secondary battery can attain a high energy density compared to a conventional aqueous secondary battery. Among secondary batteries of such a kind, a lithium secondary battery is light in weight and high in energy density, and promises to be highly utilized as a power source for a portion device, such as a note-type personal computer, a video camera, a cellular phone and the like, because lithium is the lightest metal and has the lowest electric potential of the base metals.

The lithium secondary battery which uses a simple substance of lithium metal as the negative electrode, has problems in regard to the safety and life-time of the battery, because lithium deposition on the surface of the negative electrode during charging is of a dendrite type which causes an inner short-circuit with the positive electrode or an inactivation reaction with the electrolyte.

Therefore, materials used for the negative electrode are lithium alloys or lithium compounds instead of the single element of lithium. These materials prevent the dendritic deposition of lithium by chemically reacting with the deposit of lithium during charging with the base material and containing the lithium inside the chemical compound.

The materials which have been studied are lithium alloys such as Li-Al, Li-Cd, Li-In, Li-Pb, Li-Bi and the like and Li-C. For example, lithium alloys are disclosed in U.S. Pat. No. 4,002,492 and U.S. Pat. No. 5,294,503, and Li-C is disclosed in Japanese Patent Application Laid-open No.62-23433. However, in the cases of use of the lithium alloys, sufficient life-time for charging and discharging is not attained. In the case of, Li-C, the energy capacity density per weight is one-tenth as small as those of the single element of lithium metal electrode, and accordingly the lithium characteristic of the high energy capacity density per weight is not fully utilized.

In connection with the negative electrode in a secondary battery, it is required to improve the energy density of the battery by increasing its charging capacity and its discharging capacity. In addition to the improvement of the energy density of the battery, it is also required to increase its life-time.

It has been difficult to improve both the energy density of the battery and the life-time at the same time. A Large change in the of lithium concentration in the conventional alloy during charging and discharging causes a change in the crystal structure over plural different phases, since the width of the lithium concentration range allowable for one kind of the phases is small.

When the battery is operated at room temperature, a mixture of plural phases having different structures appears in the alloy electrode and the electrode alloy is pulverized by stress and strain produced in the boundaries between different phases because a thermal equilibrium state is not attained.

The pulverization increases, electrically isolating portions. This causes a decrease in the capacity of the battery with repeated charging and discharging. Therefore, use of such a material for a negative electrode cannot attain sufficient reversibility.

An example of a base material having sufficient reversibility is carbon, for which the upper limit of the capacity is 372 mAh/g, where the inter-granular compound of $LiC_6$ is formed. However, a further increase of the capacity is accompanied by problems although various attempts have been made.

As to essential characteristics of a material for a negative electrode in a secondary battery, that is, a long life-time and a high energy capacity, in the conventional technology the lithium alloys cannot satisfy the long life-time condition and Li-C cannot attain a sufficient energy capacity condition, as described above.

SUMMARY OF THE INVENTION

An object of the present invention is to provide a high energy capacity and long life-time nonaqueous secondary battery and a negative electrode material therefor by using a lithium alloy for the negative electrode which has an energy capacity higher than that of Li-C and has a long life-time.

In a nonaqueous secondary battery having a positive electrode and a negative electrode reversibly absorbing and discharging an alkaline metal and a nonaqueous electrolyte, the nonaqueous secondary battery according to the present invention is characterized by the fact that the discharging capacity of the negative electrode during a period is 1000 to 2500 $mAh/cm^3$, the period being from a time when the battery is started to be discharged at condition of steady-state current of 0.5 $mA/cm^2$ after being charged to a time when the voltage between the negative electrode and the positive electrode becomes 1.0 V.

The nonaqueous secondary battery according to the present invention is characterized by the fact that the negative electrode is made of an inter-metallic compound containing at least one element selected from the group consisting of 4A group elements, P and Sb, an inter-metallic compound having any one of $CaF_2$ type, ZnS type and AlLiSi type crystal structures, the $CaF_2$ type structure being any one of an inverse-fluorite structure and a fluorite structure having a lattice constant larger than 6.36 Å.

The nonaqueous secondary battery according to the present invention is characterized by the fact that the negative electrode is made of an inter-metallic compound of cubic crystal system, the inter-metallic compound having any one of $CaF_2$ type, ZnS type and AlLiSi type crystal structures, the $CaF_2$ type structure being any one of an inverse-fluorite structure and a fluorite structure having a lattice constant larger than 6.36 Å.

The nonaqueous secondary battery according to the present invention is characterized by the fact that the negative electrode is made of an inter-metallic compound, the inter-metallic compound having any one of $CaF_2$ type, ZnS type and AlLiSi type crystal structures, the $CaF_2$ type structure being any one of an inverse-fluorite structure and a fluorite structure having a lattice constant larger than 6.36 Å.

The nonaqueous secondary battery according to the present invention is characterized by the fact that the negative electrode is made of an inter-metallic compound, the space group of the crystal lattice of the inter-metallic compound being F4-3m.

The nonaqueous secondary battery according to the present invention is characterized by the fact that the negative electrode is made of any one of inter-metallic compounds of $Mg_2Sn$, $Mg_2Pb$, $NiSi_2$, AlP, AlSb, CuMgSb, $Mg_2Ge$ and $CoSi_2$.

In the nonaqueous secondary battery according to the present invention, it is preferable for the negative electrode material to have has a charging capacity per volume of 1000 to 3500 mAh/cm$^3$.

In the nonaqueous secondary battery according to the present invention, it is preferable for the negative electrode material to have a charging capacity per volume of 2200 to 3500 mAh/cm$^3$.

In the nonaqueous secondary battery according to the present invention, it is preferable that the negative electrode material has a charging capacity per weight of 380 to 1400 mAh/g.

The negative electrode material for a nonaqueous secondary battery according to the present invention is characterized by the fact that discharging capacity of the negative electrode for a nonaqueous secondary battery during a period is 1000 to 2500 mAh/cm$^3$, the period being from a time when the battery is started to be discharged at a condition of a steady-state current of 0.5 mA/cm$^2$ after being charged to a time when the voltage between a negative electrode and a positive electrode of the battery becomes 1.0 V.

The negative electrode material for a nonaqueous secondary battery according to the present invention is characterized by the fact that the negative electrode material is an inter-metallic compound containing at least one element selected from the group consisting of 4A group elements, P and Sb, the inter-metallic compound having any one of $CaF_2$ type, ZnS type and AlLiSi type crystal structures, the $CaF_2$ type structure being any one of an inverse-fluorite structure and a fluorite structure having a lattice constant larger than 6.36 Å.

The negative electrode material for a nonaqueous secondary battery according to the present invention is characterized by the fact that the negative electrode material is an inter-metallic compound of the cubic crystal system, the inter-metallic compound having any one of $CaF_2$ type, ZnS type and AlLiSi type crystal structures, the $CaF_2$ type structure being any one of an inverse-fluorite structure and a a fluorite structure having a lattice constant larger than 6.36 Å.

The negative electrode material for a nonaqueous secondary battery according to the present invention is characterized by the fact that the negative electrode material is an inter-metallic compound, the inter-metallic compound having any one of $CaF_2$ type, ZnS type and AlLiSi type crystal structures, the $CaF_2$ type structure being any one of an inverse-fluorite structure and a fluorite structure having a lattice constant larger than 6.36 Å.

The negative electrode material for a nonaqueous secondary battery according to the present invention is characterized by the fact that the negative electrode material is an inter-metallic compound, the space group of the crystal lattice of the inter-metallic compound being F4-3m.

The negative electrode material for a nonaqueous secondary battery according to the present invention is characterized by the fact that the negative electrode material is any one of inter-metallic compounds of $Mg_2Sn$, $Mg_2Pb$, $NiSi_2$, AlP, AlSb, CuMgSb, $Mg_2Ge$ and $CoSi_2$.

In the negative electrode material for a nonaqueous secondary battery according to the present invention, it is preferable if the charging capacity per volume of the negative electrode material is 1000 to 3500 mAh/cm$^3$.

In the negative electrode material for a nonaqueous secondary battery according to the present invention, it is preferable that charging capacity per volume of the negative electrode is 2200 to 3500 mAh/cm$^3$.

In the negative electrode material for a nonaqueous secondary battery according to the present invention, it is preferable if the charging capacity per weight of the negative electrode material is 380 to 1400 mAh/g.

By using the inter-metallic compound according to the present invention as a base material of a negative electrode for absorbing and discharging lithium, lithium can be reversibly absorbed into and discharged from the base alloy of the negative electrode during the charging and discharging of the battery, and the absorbed and discharged amount of lithium will be larger than that in a carbon material. Therefore, it is possible to realize a nonaqueous secondary battery which has a good charging and discharging characteristic and a high in energy capacity.

Actually, the lithium concentration in the lithium alloy largely varies during the charging and discharging of the battery. In a case of using a conventional negative electrode material of a lithium alloy, such as LiAl, the width of the lithium concentration range allowable for one kind of the phases is narrow, and accordingly the lithium alloy absorbs or discharges lithium, while the phase of the lithium alloy is varying according to the lithium concentration of the lithium alloy during the charging and discharging of the battery. Therein, since the battery is operated at room temperature, it is difficult to attain a thermal equilibrium state in the solid metallic material and the distribution of the lithium concentration in the alloy is apt to become non-uniform. Therefore, the electrode alloy is pulverized by stress and strain produced in the boundaries between different phases and consequently the energy capacity of the electrode is reduced due to an increase in the number of the pulverized portions which are electrically isolated. Conventional alloys for the negative electrode are a binary alloy of lithium and a single metallic element, such as Li-Al or Li-Pb or an alloy made by adding a third element to the binary alloy in order to stabilize the phases. Since the phase of the alloy during the absorbing of lithium and the phase during the discharging of lithium are different crystal structures, a discontinuous and sharp volume change occurs depending on the change in the lithium concentration. The volume of the alloy Li-Al swells to nearly two times as much during the absorbing of lithium and shrinks to one half as much as the swelling volume during the discharging of lithium. The volume of the alloy Li-Pb increases by 20% during the absorbing of lithium due to a reaction from $Li_8Pb_3$ to $Li_7Pb_2$ and decreases by 17% during the discharging of lithium. Therefore, in such negative electrode active substances, sufficient reversibility cannot be obtained for the charging and discharging of the battery and accordingly the cycle life time of the battery is short.

In order to prevent such a phenomenon, the negative electrode active substance employed by the present invention is an inter-metallic compound of which the frame structure of the crystal lattice does not change to the large change in the lithium concentration during the charging and discharging of the battery;, in other words, there is employed an inter-metallic compound of which the deformation caused during the charging and discharging of the battery is limited to expansion or contraction. The inter-metallic compound containing a 4A group element, P or Sb in accordance with the present invention, can contain lithium in its solid matrix without having its basic crystal frame destroyed. Therefore, the crystal structure is not changed, and the volume change is caused only by expansion and contraction of the crystal lattice and accordingly is small.

This present a good reversibility both for the alloy itself and for the electrode construction as an assembly of the alloy.

Although materials applicable for the negative electrode other than 4A group elements, P and Sb, are As, Se, and Te, the elements, As, Se and Te are not preferable because of their toxicity. Further, in addition to this, preferable materials for the negative electrode are material of light weight metal or of small atomic number. Furthermore, it is preferable that the crystal structure of the inter-metallic compound in accordance with the present invention is of the cubic crystal system. The cubic crystal has three-dimensional diffusion paths for lithium atoms and therefore provide larger freedom of lithium diffusion compared to an interlayer compound which has two-dimensional diffusion paths. In addition to this, since the cubic crystal isometrically deforms in three directions, the amount of deformation in one direction is small and accordingly the reversibility for the absorbing and discharging of lithium is better. Further, it is preferable if that the lattice constant of the crystal is large. Since the space inside a lattice is larger as the lattice constant is larger, activation energy of diffusion is low and accordingly lithium atoms easily diffuse. Thereby, lithium is taken into the solid in a short time when the lithium is electrolytically deposited on the surface of the alloy during the charging of the battery, and, at the same time, the inactivation reaction of the lithium with the electrolyte on the surface of the alloy can be suppressed. Since the deformation rate of the lattice can be suppressed to small value, the expansion and contraction of the alloy can be also suppressed to a small value and accordingly the construction of the electrode is hardly destroyed.

The preferable crystal structure is one in which all or a part of the eight positions of the tetrahedrons inside a face centered cubic lattice has shown in FIG. 1, are occupied. The structures in which all or a part of the eight positions of the tetrahedrons inside a face centered cubic lattice are occupied are a $CaF_2$ type structure shown in FIG. 8, a ZnS type structure shown in FIG. 9 and a AlLiSi type structure shown in FIG. 10, which have large porosities in the crystal lattice.

It can be understood from FIG. 2 that the $CaF_2$ type structure, the ZnS type structure and the AlLiSi type structure have large porosities in the crystal lattice compared to the closest packed cubic structure, the body centered cubic structure and a simple cubic structure, and have consequently better diffusivities of lithium inside the solid and better lithium containing abilities. The porosities in the crystal lattice are nearly 26% for the closest packed cubic structure, nearly 32% for a body centered cubic structure and nearly 48% for a simple cubic structure, and nearly 51% for the $CaF_2$ type structure and the AlLiSi type structure, and nearly 66% for the ZnS type structure.

It can be understood that a simple cubic structure, the $CaF_2$ type structure the ZnS type structure and the hAlLiSi type structure have large porosities in the crystal lattice above 40% which are larger than those of the closest packed cubic structure and body centered cubic structure, and have consequently better diffusivities of lithium inside the solid and better lithium containing abilities.

ZnS the type structure and AlLiSi type structure are of space groups of the crystal lattice of F4-3m which have large porosities in the crystal lattice and have consequently better diffusivities of lithium inside the solid and better lithium containing abilities.

That is, the discharging capacity of the negative electrode material can be increased and the life time of the negative electrode material can be increased by setting the discharging capacity of the negative electrode material, obtained from time-integration of current during a period, to a range of 1000 to 2500 mAh/cm$^3$, the period being from a time when the battery is started to be discharged at condition of steady-state current of 0.5 MA/cm$^2$ after being charged to a time when the voltage between the negative electrode and the lithium metal reference electrode becomes 1.0 V. By using the negative electrode material in a nonaqueous secondary battery, it is possible to provide a long life-time and high energy density nonaqueous battery.

DETAILED DESCRIPTION OF THE PREFERRED EMBODIMENTS

[Embodiment 1]

Figure 1:
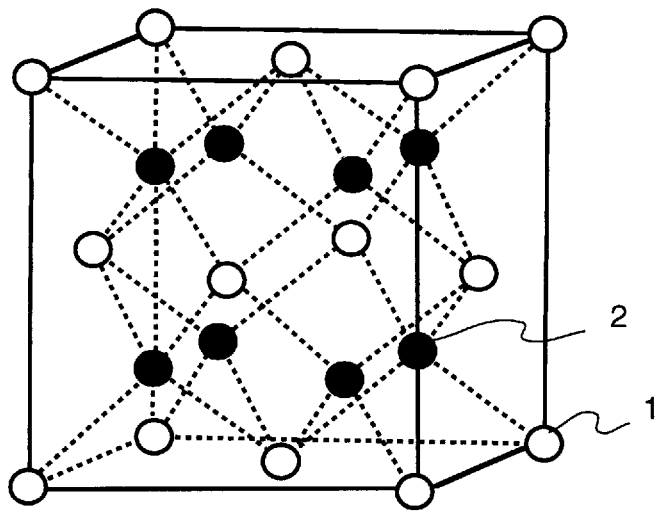
FIG. 1 is a diagrammatic view showing the space lattice of a face centered cubic crystal and the positions of the tetrahedrons.
Figure 2:
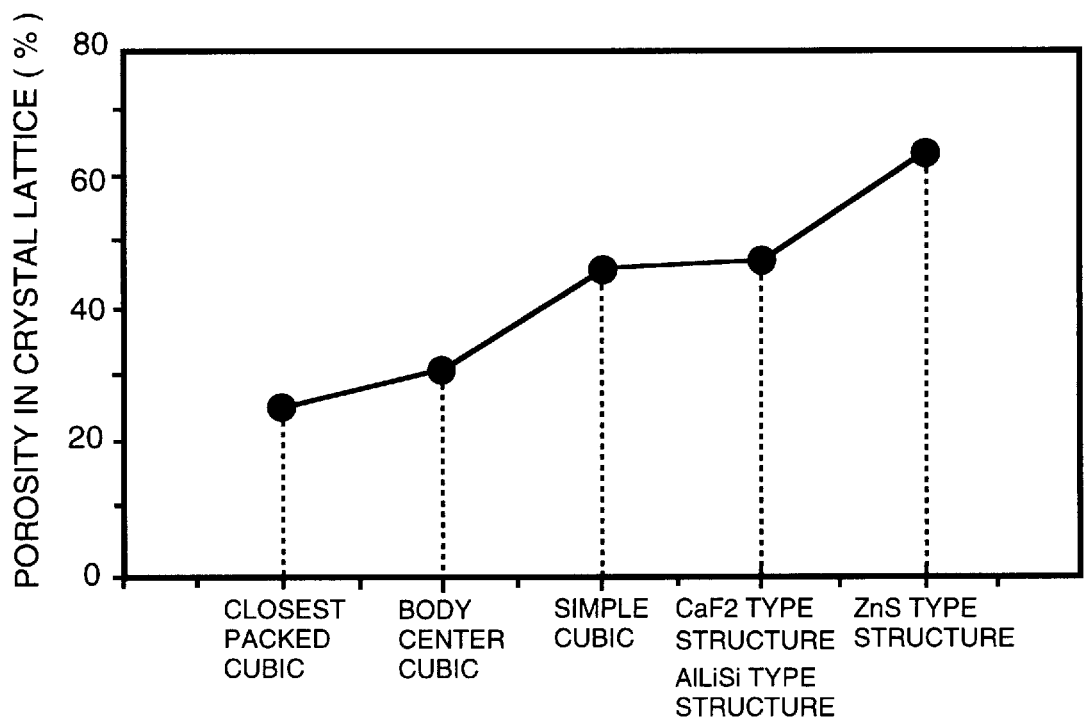
FIG. 2 is a graph showing the interstice ratio of cubic crystal structures according to the solid sphere model.

Table 1 shows examples of inter-metallic compounds which contain at least one of 4A group elements of Si, Ge, Sn, Pb and P and Sb, and have cubic crystal structures.

TABLE 1

| ELEMENT | INTER-METALLIC COMPOUND | CRYSTAL STRUCTURE |
|---|---|---|
| Si | $NiSi_2$ | $CaF_2$ TYPE STRUCTURE (INVERSE FLUORITE STRUCTURE) |
|  | $CoSi_2$ | $CaF_2$ TYPE STRUCTURE (INVERSE FLUORITE STRUCTURE) |
|  | $Mg_2Si$ | $CaF_2$ TYPE STRUCTURE (INVERSE FLUORITE STRUCTURE) |
| Ge | $Mg_2Ge$ | $CaF_2$ TYPE STRUCTURE (INVERSE FLUORITE STRUCTURE) |
| Sn | $Mg_2Sn$ | $CaF_2$ TYPE STRUCTURE (INVERSE FLUORITE STRUCTURE) |
| Pb | $Mg_2Pb$ | $CaF_2$ TYPE STRUCTURE (INVERSE FLUORITE STRUCTURE) |
| P | AlP | ZnS TYPE STRUCTURE |
|  | GaP | ZnS TYPE STRUCTURE |
|  | InP | ZnS TYPE STRUCTURE |
| Sb | AlSb | ZnS TYPE STRUCTURE |
|  | GaSb | ZnS TYPE STRUCTURE |
|  | InSb | ZnS TYPE STRUCTURE |
|  | CuMgSb | AlLiSi TYPE STRUCTURE |
|  | MgPdSb | AlLiSi TYPE STRUCTURE |
|  | MgNiSb | AlLiSi TYPE STRUCTURE |

AlP, AlSb and CuMgSb are of space groups of the crystal lattice of F4-3m.

Manufacturing and measurement of all cells for test evaluation were performed in an argon gas environment.

An electrode was formed in a complex electrode according to the geometries of an electrode used in an actual battery by mixing a powder alloy with a binding agent and carbon.

Therefore, each of the following test result show combined characteristics of a physical property of each alloy itself and the manufacturing process of the electrode, and consequently is equivalent to a test result of an actual battery using each of the alloys.

The inter-metallic compound powders $NiSi_2$, $Mg_2Ge$, $Mg_2Sn$, $Mg_2Pb$, AlP, AlSb, CuMgSb for the negative electrodes were prepared by vacuum-melting the materials and pulverizing them under an argon environment to form powders having a grain size below 45 μm.

These powders were analyzed by an X-ray diffraction method and it was confirmed that $NiSi_2$, $Mg_2Ge$, $Mg_2Sn$, $Mg_2Pb$ were of a $CaF_2$ type structure, AlP, AlSb were of a ZnS type structure and CuMgSb wasof a AlLiSi type structure.

Pastes of mixed agents were prepared by mixing and kneading these powders with ethylene-propylene-diene ternary co-polymer (EPDM) (concentration of 40 g/l solved with xylene) of 5.0 wt % as a binding agent and heat-dehydrated acetylene black having a specific surface area of 61 $m_2$ of 10 wt % as a conductivity adding powder.

The paste of a mixed agent was applied onto a collector copper film and vacuum-dried at room temperature for 2 hours, and then pressed with 500 $kg/cm^2$ for 10 minutes and cut in a disk-shape having a diameter of 15 mm to form a negative electrode.

A positive electrode was formed by mixing and kneading $LiCoO_2$ of 80 wt % with acetylene black of 15 wt % and tetra-fluoro-ethylene (PTFE) of 5 wt % to prepare a mixed agent, and pressing the mixed agent of 0.2 g with 200 $kg/cm_2$ using a piston and cylinder having diameter of 15 mm to form it in a disk shape.

Figure 3:
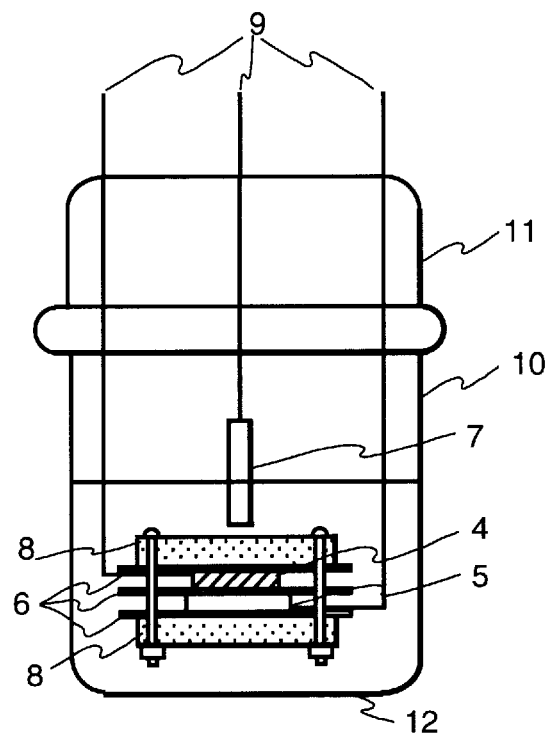
FIG. 3 is a diagram view showing the construction of a battery used for a test.

A test battery shown in FIG. 3 was manufactured using both of the aforementioned electrodes, a fine porous poly-propylene film as a separator, a mixture of $LiPF_8$/propylene carbonate of 1 mol/l concentration+1, 2 dimethoxy ethane (50% solution) as an electrolyte and a lithium metal reference electrode. Referring to FIG. 3, the test battery includes the negative electrode 4, the positive electrode 5, the separators 6, the lithium metal reference electrode 7, stainless steel plates 8 for fixing both the positive electrode and the negative electrode, wires 9, a vessel 10, a cover 11, the electrolyte 12 and a positive electrode side collector 13.

The test electrode faces the opposed electrode of lithium metal through the porous poly-propylene separator, and is put between and pressed by the stainless steel separators.

This construction is designed to prevent the mixed agent from swelling by absorbing the electrolyte and to suppress occurrence of poor contact between the constituent particles to produce electrical isolating portions inside the electrode due to a volume change caused by lithium absorption and discharge of the alloy powder during the charging and discharging of the battery.

Lithium metal was used for the reference electrode to measure an electric potential of the test electrode in the base of the electric potential of the $(Li/Li^+)$. Measurement of a charging capacity of the negative electrode using the battery was conducted by establishing a condition of a steady-state charging current of 0.1 $mA/cm^2$, and measuring the time until the electric potential became 0 Volt in the electric potential measurement between the negative electrode and the lithium metal reference electrode, and then determining an amount of lithium absorbed in the negative electrode, that is to say, an electrolytic depositing amount of lithium by time-integration of the conducted current.

The volume of the inter-metallic compound was determined by subtracting the known volume of the acetylene black from the volume of the negative electrode.

Results of X-ray diffraction analyses of the negative electrodes in charged states suggested that each of the diffraction image patterns before charging for the inter-metallic compounds was maintained and the space lattice was uniformly expanded, and accordingly lithium atoms were contained between the lattice of the crystal structure, without the crystal structure before charging, being destroyed.

Figure 4:
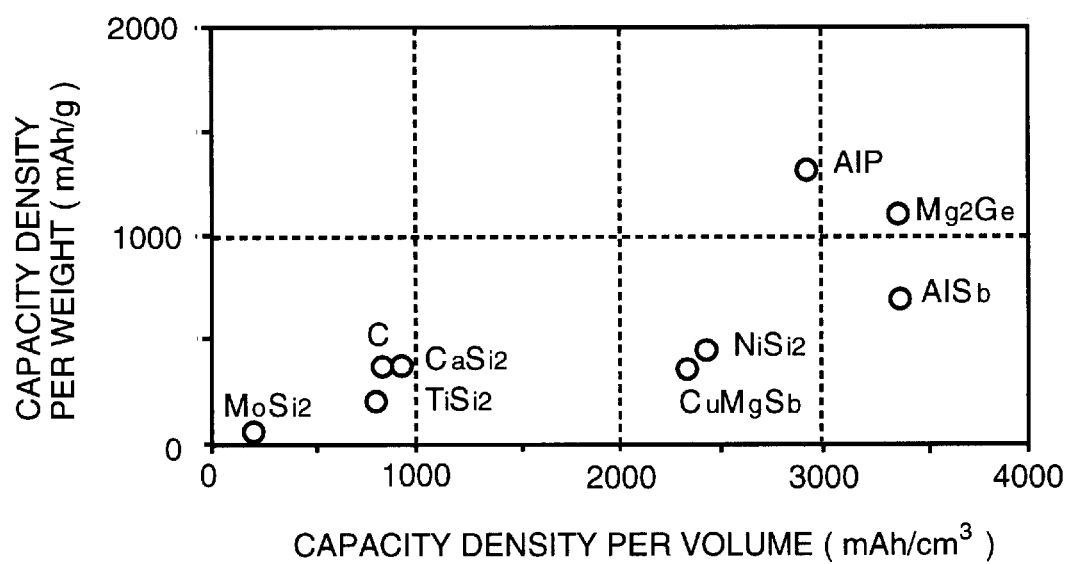
FIG. 4 is a graph showing the relationship between capacity density per weight and capacity density per volume for inter-metallic compounds.

FIG. 4 and Table 2 show the relationship between charging capacity per weight and charging capacity per volume for the inter-metallic compounds.

TABLE 2

| INTER-METALLIC COMPOUND | $MoSi_2$ | $TiSi_2$ | $NiSi_2$ | $NiSi_2$ | $Mg_2Sn$ |
|---|---|---|---|---|---|
| CHARGING CAPACITY PER WEIGHT (mAh/g) | 36 | 200 | 138 | 499 | 788 |
| CHARGING CAPACITY PER VOLUME (mAh/cm³) | 225 | 804 | 997 | 2445 | 2837 |
| INTER-METALLIC COMPOUND | $Mg_2Pb$ | $Mg_2Ge$ | AlP | AlSb | CuMgSb |
| CHARGING CAPACITY PER WEIGHT (mAh/g) | 524 | 1139 | 1386 | 795 | 382 |
| CHARGING CAPACITY PER VOLUME (mAh/cm³) | 2786 | 3531 | 2911 | 3418 | 2292 |

For the purpose of comparison, as silicon inter-metallic compounds having crystal structures other than a cubic crystal structure, negative electrodes of $MoSi_2$ (tetragonal crystal structure), $TiSi_2$ (ortho-rhombic crystal structure) and $Ni_2Si$ (ortho-rhombic crystal structure) were manufactured and evaluated using the same methods.

Each of the inter-metallic compounds according to the present invention, NiSi, $Mg_2Sn$, $Mg_2Pb$, AlP, AlSb and CuMgSb, has a large charging capacity which is larger than the theoretical capacity of the typical negative material of carbon, that is, 372 (mAh/g) and 837 (mAh/cm$^3$).

The charging capacity per weight and the charging capacity per volume for each of the negative electrodes are compared with those of the theoretical capacities for carbon, and the results are shown in Table 3.

As shown in Table 3, the charging capacities per weight of the negative electrodes are nearly 1.03 to 3.73 times as large as the theoretical value of the carbon electrode and the charging capacities per volume of the negative electrodes are nearly 2.74 to 4.08 times as large as the theoretical value of the carbon electrode. Especially, the charging capacities per weight of five kinds of the negative electrodes for AlP, $Mg_2Ge$, AlSb, $Mg_2Sn$ and $Mg_2Pb$ are more than two times as large as the theoretical value of the carbon electrode, and the charging capacities per volume of the negative electrodes are more than three times as large as the theoretical value of the carbon electrode.

A discharging test was performed by discharging at a condition of a steady-state current of 0.5 mA/cm$^2$ after being charged and the discharging capacity of the negative electrode material was obtained from time-integration of current during a period from a time when the battery is started to be discharged to a time when the voltage between the negative electrode and the lithium metal reference electrode becomes 1.0 V.

TABLE 3

| MATERIAL OF NEGATIVE ELECTRODE | MAGNITUDE OF CHARGING CAPACITY TO THEORETICAL CAPACITY OF CARBON (TIMES) | | DISCHARGING CAPACITY (mAh/cm$^3$) |
|---|---|---|---|
| | WEIGHT | VOLUME | |
| C | | | 700 |
| Li-NiSi$_2$ | 1.34 | 2.92 | 1380 |
| Li-Mg$_2$Ge | 3.06 | 4.21 | 1420 |
| Li-AlP | 3.73 | 3.48 | 1910 |
| Li-AlSb | 2.14 | 4.08 | 2250 |
| Li-CuMgSb | 1.03 | 2.74 | 1910 |
| Li-Mg$_2$Sn | 2.12 | 3.39 | 1807 |
| Li-Mg$_2$Pb | 1.41 | 3.33 | 1775 |

Figure 5:
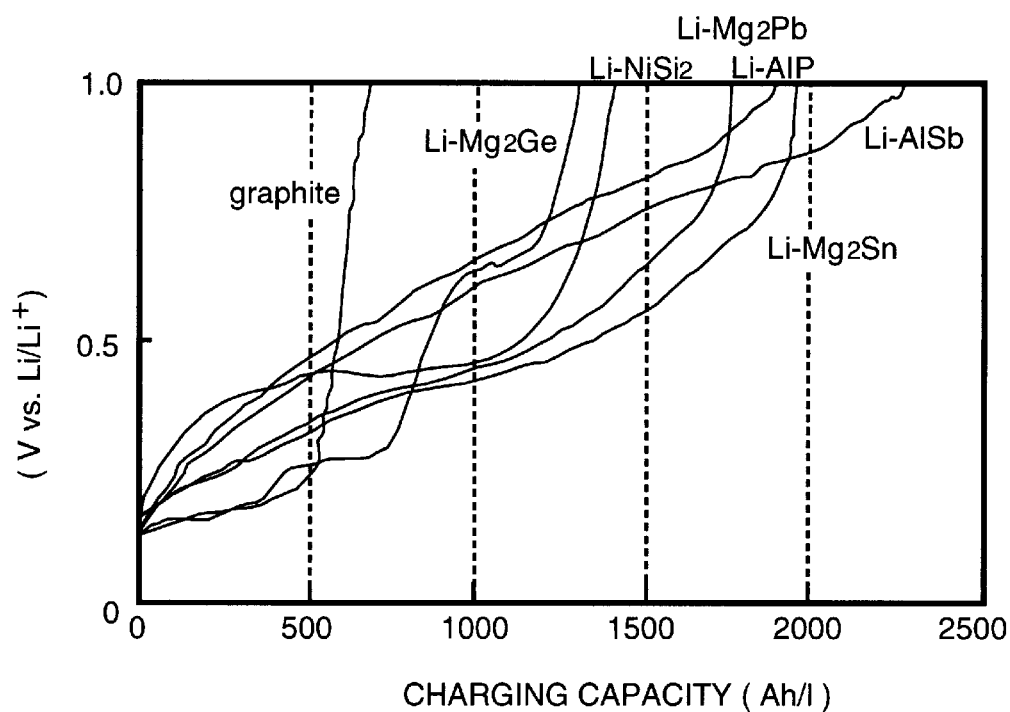
FIG. 5 is a graph showing discharge characteristics of inter-metallic compounds.

FIG. 5 shows a change in electric potential during a discharging process and an attainable discharging capacity for each of the batteries having the inter-metallic compounds and carbon until the electric potential becomes 1.0 V.

The discharging curve for carbon slowly changes in the electric potential range from 0 to approximately 0.2 V, and steeply changes when the discharging capacity exceeds approximately 500 mAh/cm$^3$, and then the discharging capacity reaches approximately 700 mAh/cm$^3$ at the electric potential of 1.0 V.

The discharging curve for Li-NiSi$_2$ gradually changes in the electric potential range from 0 to approximately 0.4 V, slowly changes in the electric potential range from approximately 0.4 to approximately 0.5 V, and steeply changes when the discharging capacity exceeds approximately 1100 mAh/cm$^3$, and then the discharging capacity reaches approximately 1380 mAh/cm$^3$ at the electric potential of 1.0 V.

The discharging curve for Li-Mg$_2$Ge gradually changes until a point of discharging capacity of approximately 400 mAh/cm$^3$ and then enters into a plateau in a level of approximately 0.25 V. After discharging approximately 300 mAh/cm$^3$ at the plateau, the discharging curve steeply changes and enters into another plateau in a level of approximately 0.65 V. After discharging approximately 200 mAh/cm$^3$ at the second plateau, the discharging curve steeply changes again and then the discharging capacity reaches approximately 1420 mAh/cm$^3$ at the electric potential of 1.0 V.

The discharging curve for Li-Mg$_2$Pb gradually changes, and after discharging approximately 1600 mAh/cm$^3$, the discharging capacity reaches approximately 1775 mAh/cm$^3$ at the electric potential of 1.0 V.

The discharging curve for Li-Mg$_2$Sn gradually changes, and after discharging approximately 1700 mAh/cm$^3$, the discharging capacity reaches approximately 1807 mAh/cm$^3$ at the electric potential of 1.0 V.

The discharging curve for Li-AlP gradually changes, and the discharging capacity reaches approximately 1910 mAh/cm$^3$ at the electric potential of 1.0 V.

The discharging curve for Li-AlSb gradually changes, and the discharging capacity reaches approximately 2250 mAh/cm$^3$ at the electric potential of 1.0 V.

The discharging curve for Li-CuMgSb slowly changes in the electric potential range from 0 to approximately 0.3 V, gradually changes when the discharging capacity exceeds approximately 750 mAh/cm$^3$, steeply changes when the discharging capacity exceeds approximately 1500 mAh/cm$^3$, and then the discharging capacity reaches approximately 1890 mAh/cm$^3$ at the electric potential of 1.0 V.

Compared to the discharging capacity of carbon of approximately 700 mAh/cm$^3$ at the electric potential of 1.0 V, the discharging capacity for Li-NiSi$_2$ is approximately 1.97 times as high, the discharging capacity for Li-Mg$_2$Ge is approximately 1.70 times as high, the discharging capacity for Li-Mg$_2$Sn is approximately 2.15 times as high, the discharging capacity for Li-Mg$_2$Pb is approximately 2.12 times as high, and the discharging capacity for Li-AlP is approximately 2.72 times as high, the discharging capacity for Li-AlSb is approximately 3.21 times as high, the discharging capacity for Li-CuMgSb is approximately 2.70 times as high. It can be understood that the discharging capacities for the negative electrode materials in accordance with the present invention are approximately two to three times as large as that for carbon.

As described above, in comparison to the conventional carbon electrode, the charging capacities per weight of the negative electrodes according to this embodiment of approximately 1.03 to 3.73 times as large and the charging capacities per volume of the negative electrodes according to this embodiment is approximately 2.74 to 4.08 times as large, and accordingly the charging capacities can be increased. The discharging capacities are approximately 2 to 3 times as large as that of carbon, and accordingly the discharging capacities can be also increased.

[Embodiment 2]

Inter-metallic compounds shown in Table 4 were manufactured using the same method as in Embodiment 1 and the same tests as in Embodiment 1 were performed using batteries similar to one shown in FIG. 3. The results are shown in Table 4.

According to the X-ray diffraction images of the negative electrodes in charged states, the X-ray diffraction image pattern before charging for each of the inter-metallic compounds was maintained, but the pattern was shifted to the low angle side. Therefore, it was suggested that each of the diffraction image patterns before charging for the inter-metallic compounds was maintained and the space lattice was uniformly expanded, and accordingly lithium atoms were contained between the lattice of the crystal structure, without the crystal structure, before charging, being destroyed.

maintained. From the result, it was considered that lithium atoms entered into the lattice without changing the frame structure. The linear expansion rate was approximately 0.47% and the volume expansion rate was approximately 1.42%.

TABLE 4

| MATERIAL OF NEGATIVE ELECTRODE | CHARGING CAPACITY PER WEIGHT (mAh/g) | CHARGING CAPACITY PER VOLUME (mAh/cm$^3$) | MAGNITUDE OF CHARGING CAPACITY TO THEORETICAL CAPACITY OF CARBON (TIMES) | | CRYSTAL STRUCTURE |
|---|---|---|---|---|---|
| | | | CHARGING CAPACITY PER WEIGHT | CHARGING CAPACITY PER VOLUME | |
| NiSi$_2$ | 499 | 2445 | 1.34 | 2.92 | cubic |
| Mg$_2$Si | 1607 | 3053 | 4.32 | 3.65 | cubic |
| Mg$_2$Ge | 1095 | 3384 | 2.94 | 4.04 | cubic |
| Mg$_2$Sn | 788 | 2837 | 2.12 | 3.39 | cubic |
| Mg$_2$Pb | 524 | 2786 | 4.41 | 3.33 | cubic |
| AlSb | 795 | 3418 | 2.14 | 4.08 | cubic |
| CoSi$_2$ | 108 | 539 | 0.29 | 0.64 | cubic |
| MoSi$_2$ | 58 | 363 | o.16 | 0.43 | tetragonal |
| TiSi$_2$ | 252 | 1013 | 0.76 | 1.21 | ortho rohmbic |
| Ni$_2$Si | 138 | 997 | 0.37 | 1.19 | ortho rohmbic |

Figure 13:
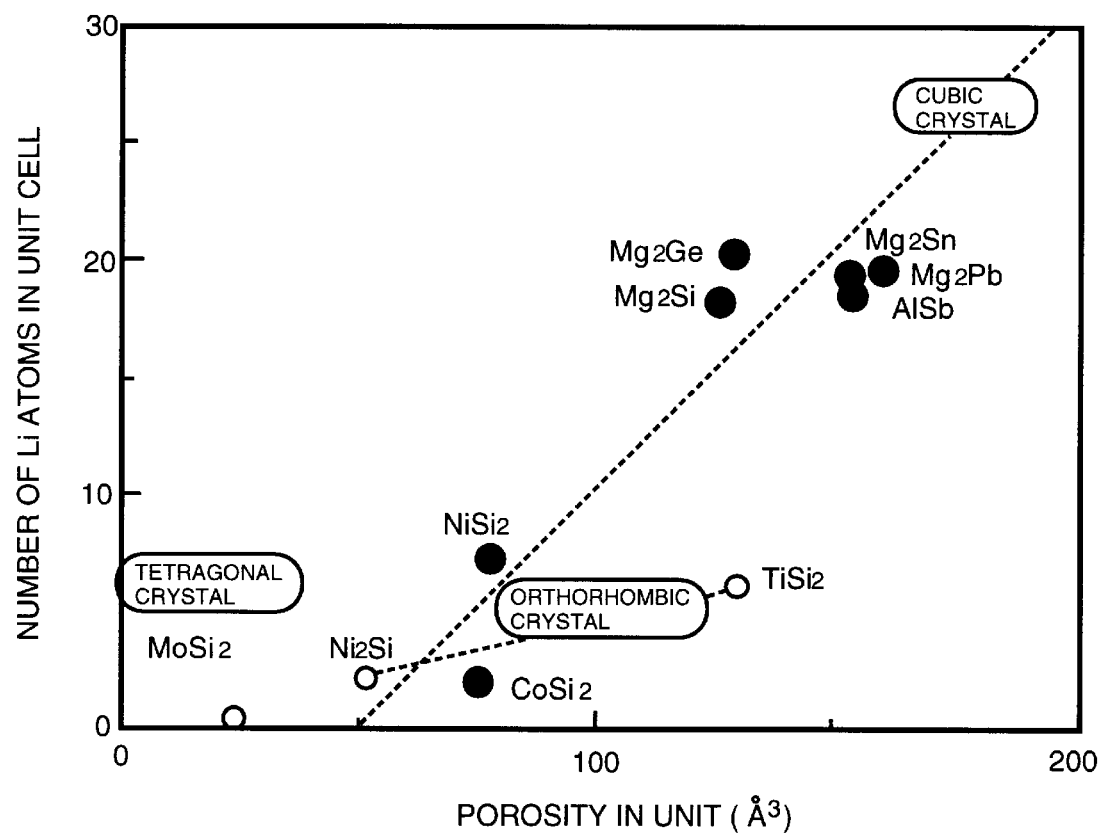
FIG. 13 is a graph showing the relationship between number of Li elements in a unit cell of a lattice and interstitial volume in a unit cell of a lattice.

FIG. 13 is a graph showing the relationship between the number of Li atoms in a unit cell of a lattice determined from the charging capacity and interstitial volume in a unit cell of a lattice for each of the inter-metallic compounds. The interstitial volume in a unit cell of a lattice can be determined from the crystal structure and the lattice constant. In the tetragonal crystal structure and the ortho-rhombic crystal structure, the number of Li atoms which entered into a unit cell of a lattice is few, and even in a case where the interstitial volume in a unit cell of a lattice is large, the number of Li atoms capable of entering into a unit cell of a lattice increases very little. On the other hand, in the cubic crystal structure, in a case where the interstitial volume in a unit cell of a lattice is large, the number of Li atoms capable of entering into a unit cell of a lattice increases largely. From the above facts, in order to increase the charging capacity, it is preferable if the negative electrode is made of an inter-metallic compound and the crystal structure of the inter-metallic compound is cubic and the lattice constant of the cubic crystal structure is large.

By employing an inter-metallic compound of a lithium interstitial-lattice type having cubic crystal structure as described above, in comparison to the conventional carbon electrode, the charging capacities per weight of the negative electrodes according to this embodiment are approximately 1.03 to 3.73 times as large and the charging capacities per volume of the negative electrodes according to this embodiment are approximately 2.74 to 4.08 times as large, and accordingly the charging capacities can be increased.

[Embodiment 3]

Figure 11:
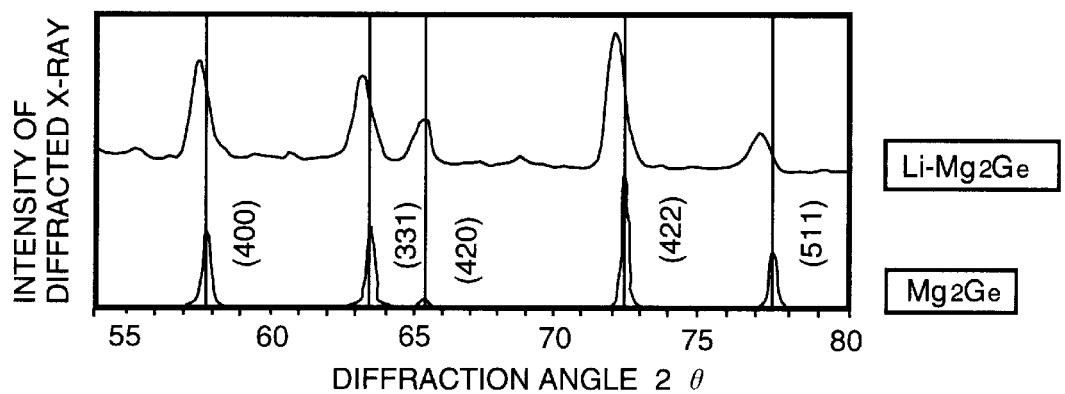
FIG. 11 is a characteristic showing a X-ray diffraction image of $Mg_2Ge$ (before and after absorbing Li).

From a diffraction image shown in FIG. 11, it can be confirmed that the test sample of Mg$_2$Ge was nearly a single phase sample of Mg$_2$Ge having cubic crystal of a CaF$_2$ type structure. A charging test was performed using the same test electrode and the same battery construction as in Embodiment 1 with charging current density of 0.1 mA/cm$_2$. The diffraction image of the sample after lithium absorption was shifted to the low angle side while the diffraction peaks were maintained. From the result, it was considered that lithium atoms entered into the lattice without changing the frame structure. The linear expansion rate was approximately 0.47% and the volume expansion rate was approximately 1.42%.

A lithium-free sample was made by removing lithium from a lithium absorbed sample, and a structure change was studied using the lithium-free sample. An alloy after absorbing lithium was discharged at the same current density as the current density at which lithium was absorbed in the alloy until the electric potential became 1.0 V, and then was further discharged for 1.3 days while the discharge current was exponentially decreased so as to maintain the electric potential at 1.0 V.

Figure 12:
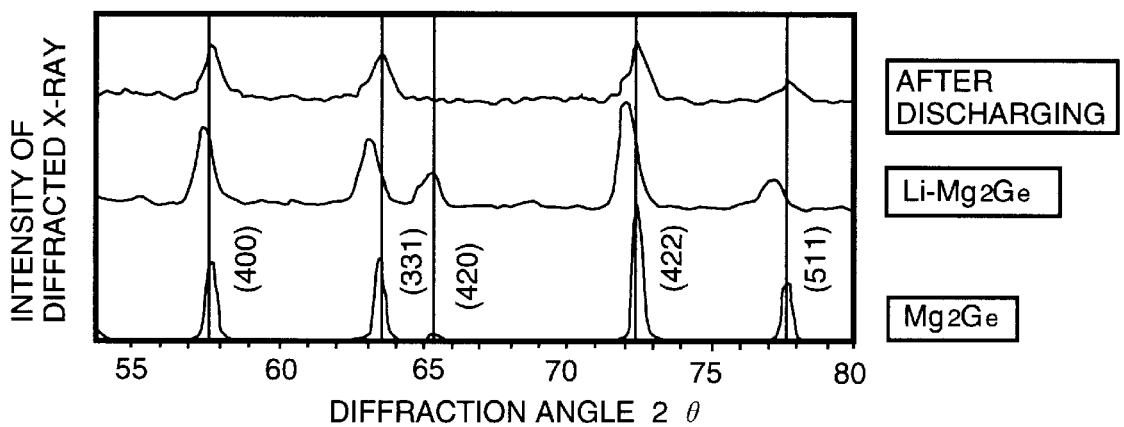
FIG. 12 is a characteristic diagram showing change in a X-ray diffraction image of $Mg_2Ge$ (absorbing and discharging Li).

As shown in FIG. 12, the diffraction image of the above sample maintains the diffraction peaks before absorbing lithium, and the peaks are shifted to the higher angle side in comparison to the sample before absorbing lithium.

This means that the frame structure of the lattice is maintained, but is contracted in this case.

That is, the results can be summarized as follows.

Figure 7:
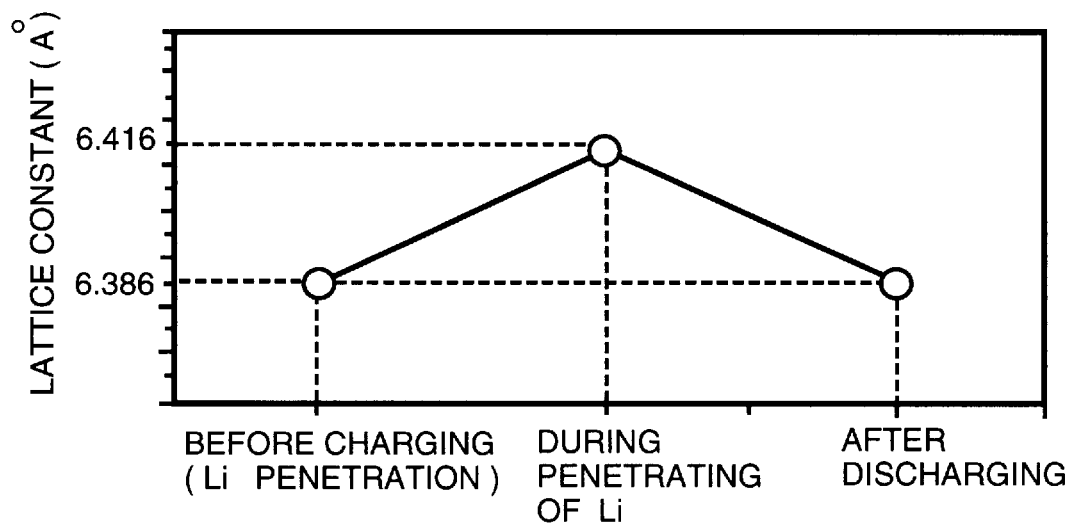
FIG. 7 is a graph showing volume change of $Mg_2Ge$ during the charging and discharging.
Figure 8:
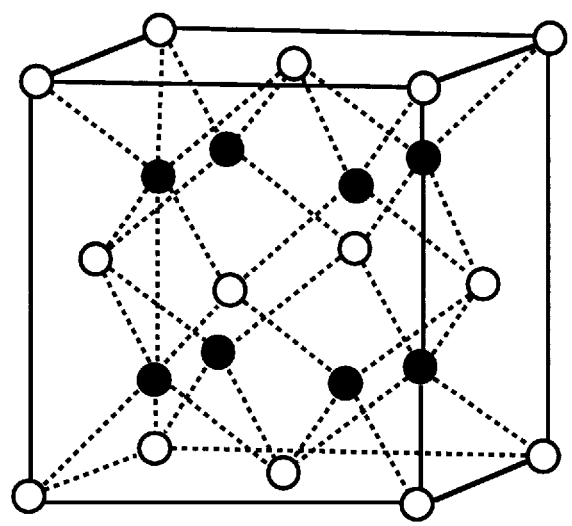
FIG. 8 is a diagrammatic view showing the space lattice of $CaF_2$ type structure.
Figure 9:
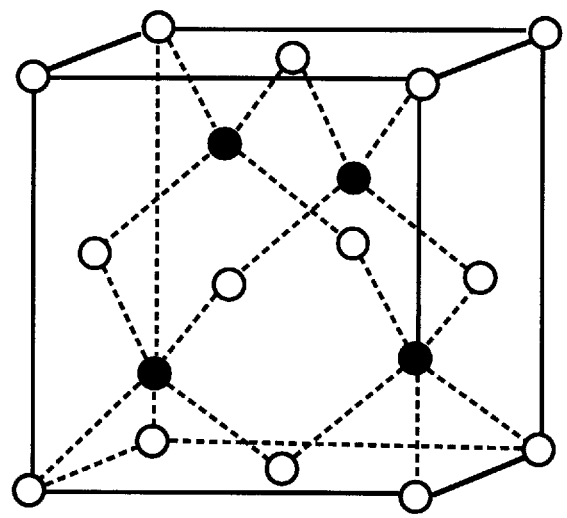
FIG. 9 is a diagrammatic view showing the space lattice of ZnS type structure.
Figure 10:
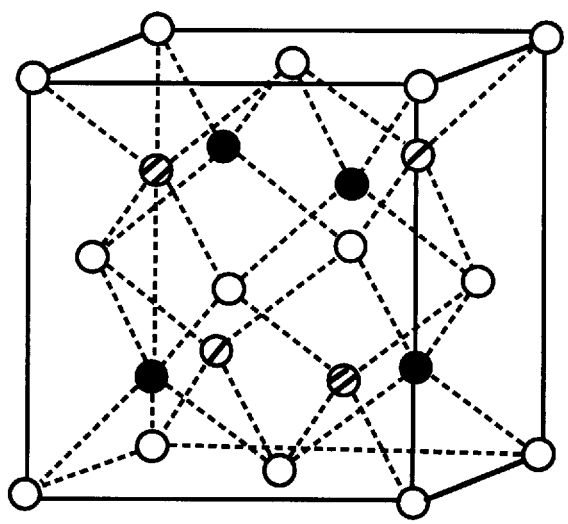
FIG. 10 is a diagrammatic view showing the space lattice of AlLiSi type structure.

FIG. 7 shows volume change of Mg$_2$Ge during the charging and discharging.

The lattice constant of Mg$_2$Ge before absorbing lithium is 6.386 Å, and the lattice constant after absorbing lithium increases by 1.004697776 times as large and becomes 6.416 Å. Then, after discharging, the lattice constant returns to 6.386 Å. Since the change in lattice constant is small, the volume change due to the absorbing of lithium and discharging is small.

Further, in a case of removing lithium from the sample of Mg$_2$Ge, the lattice constant changes by the order of $10^{-3}$ Å, and therefore, Mg$_2$Ge has a sufficient reversibility against charging and discharging reaction.

A charging and discharging cycle life-time test was performed. After charging was performed using the same test electrode and the same battery construction as in, a charging current density of 0.1 MA/cm$_2$, the test was performed by setting the discharging depth to a constant value of 160 mAh/g, the charging and discharging terminal electric potentials to 0 V and 1.0 V, respectively, and current density to 20 mA/g.

For the purpose of comparison, a Li-Pb alloy not of the lithium interstitial-lattice type was also used.

Figure 6:
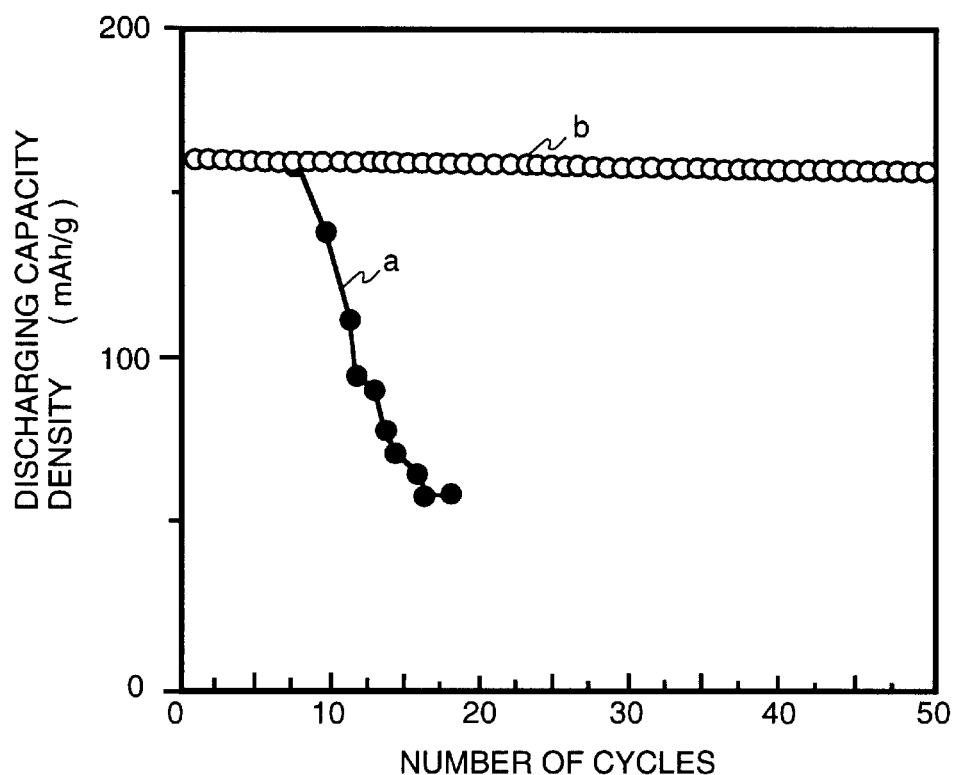
FIG. 6 is a graph showing charge and discharge cycle characteristics of inter-metallic compounds.

FIG. 6 shows the results. The reference character a in the figure indicates a charge and discharge cycle life-time characteristic of Li-Pb and the reference character b in the figure indicates the charge and discharge cycle life-time characteristics of the inter-metallic compounds in accordance with the present invention, that is, NiSi, $Mg_2Ge$, $Mg_2Sn$, $Mg_2Pb$, AlP, AlSb and CuMgSb.

The alloys for negative electrode materials according to the present invention show stable charge and discharge cycle life-time characteristics. On the other hand, in Li-Pb, which is not of the lithium interstitial-lattice type and is large in volume change of the negative electrode alloy at charging and discharging, the discharging capacity density steeply decreases.

The charge and discharge cycle life-time characteristic curve for Li-Pb maintains a level of 160 mAh/g for 8 cycles, but steeply decreases after that and becomes 60 mAh/g at 18 cycles. It can be understood that the discharging capacity density decreases to 37.5% at nearly 20 cycles, and the life-time of Li-Pb is short.

The charge and discharge cycle life-time characteristic curves for the inter-metallic compounds in accordance with the present invention, that is, NiSi, $Mg_2Ge$, $Mg_2Sn$, $Mg_2Pb$, AlP, AlSb and CuMgSb, maintain a level of 160 mAh/g until 20 cycles and further maintain a level of 160 mAh/g even for 50 cycles. The inter-metallic compounds in accordance with the present invention can maintain the initial discharging capacity for of more than 50 cycles, so that the life-time can be substantially extended.

It can be understood that number of cycles capable of maintaining 160 mAh/g for the inter-metallic compounds in accordance with the present invention is more than 50 cycles, which is approximately 6.25 times as much as 8 cycles capable of maintaining 160 mAh/g for Li-Pb.

[Embodiment 4]

A charging and discharging cycle life-time test was performed using the same test electrode and the same battery constructed as in Embodiment 1 under a condition that the charging current density was set to 0.5 $mA/cm_2$, the charging and discharging terminal electric potentials were set to 0 V and 1.0 V with respect to the electric potential of ($Li/Li^+$), respectively, and a 30-minute pause was provided between charging and discharging. This condition is for a high capacity discharging test, since discharging is performed up to a high electric potential of 1.0 V and there is no limitation to the electric capacity during the discharging.

Table 5 shows the lattice constants of the cubic crystal inter-metallic compounds.

That is, the lattice constant for $Mg_2Pb$ is 6.836 Å, the lattice constant for $Mg_2Sn$ is 6.77 Å and the lattice constant for $Mg_2Si$ is 6.35 Å.

TABLE 5

| INTER-METALLIC COMPOUND | $NiSi_2$ | $Mg_2Si$ | $Mg_2Sn$ | $Mg_2Pb$ |
|---|---|---|---|---|
| LATTICE CONSTANT (Å) | 5.38 | 6.35 | 6.77 | 6.836 |

Figure 14:
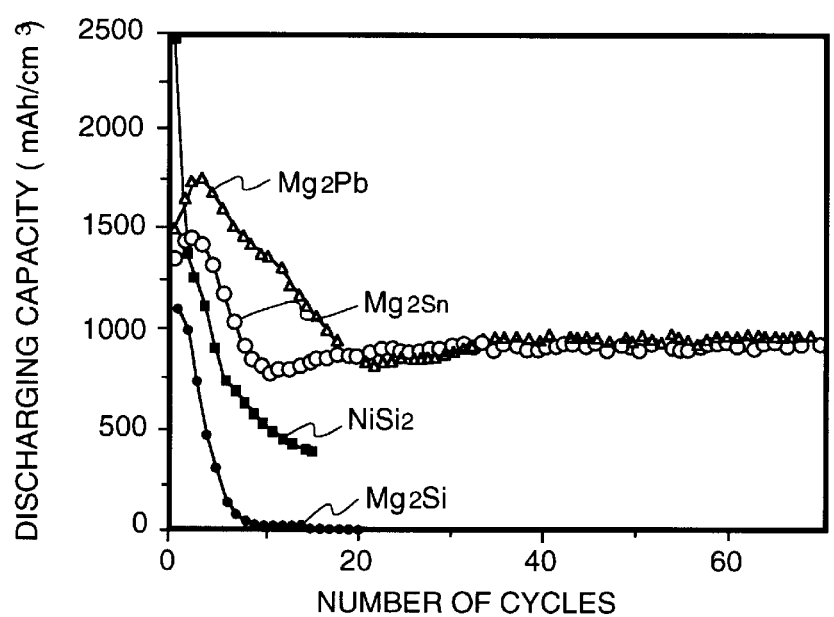
FIG. 14 is a graph showing the relationship between discharge capacity and number of cycles.

FIG. 14 is a graph showing cycle characteristics for $NiSi_2$, $Mg_2Si$, $Mg_2Sn$ and $Mg_2Pb$. In the high capacity discharging test condition, the discharging capacities for $NiSi_2$ and $Mg_2Si$ having small lattice constants steeply decrease as the cycles increase, and the discharging capacity for $NiSi_2$ decreases to below 10% of the initial discharging capacity at 10 cycles and the discharging capacity for $Mg_2Si$ decreases to 20% of the initial discharging capacity at 10 cycles. However, although the discharging capacities for $Mg_2Sn$ and $Mg_2Pb$ in accordance with the present invention having lattice constants of above 6.36Å decrease during the initial several cycles, the discharging capacity for $Mg_2Sn$ can maintain 900 Ah/l above 70 cycles and the discharging capacity for $Mg_2Pb$ can maintain 930 Ah/l above 70 cycles. That is to say, by employing an alloy of an inter-metallic compound having a cubic crystal structure of which the lattice constant is above 6.36Å and an alkaline metal, the life-time of the negative electrode material can substantially be extended.

[Embodiment 5]

Figure 15:
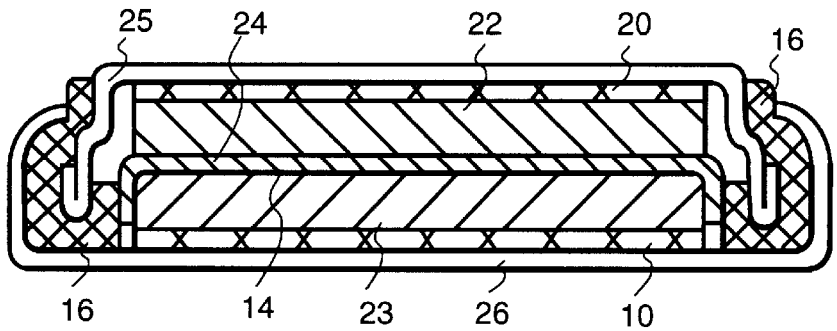
FIG. 15 is a cross-sectional view showing a coil battery.

A coin-type battery as shown in FIG. 15 was manufactured using a positive electrode and a negative electrode manufactured by the same method as in Embodiment 1. The coin-type battery includes a negative electrode 22, a positive electrode 23, a separator 24, a negative electrode side case 25 and a positive electrode side case 26. Although in Embodiment 1 the negative electrode material paste was applied onto a copper film, in this embodiment the negative electrode material was formed in a disk-shape as the positive electrode.

The non-aqueous electrolyte liquid 14 used was a solution containing 1 mol/liter concentration of $LiPF_6$ added to a mixture of equal volumes of propylene carbonate (PC) and 1,2-dimethoxy ethane (DME).

The separator 24 was a porous propylene film. An aluminum plate is used for a positive electrode side collector 10 and a nickel plate was used for a negative electrode side collector 20. A battery vessel was composed of a positive electrode side case 26 and a negative electrode side case 25, both of which were made of a stainless steel (SUS304), and a gasket 16 made of polypropylene for fixing the positive electrode side case 26 and the negative electrode side case 25.

In this coin-type battery, the discharging capacity was increased and the life-time was also extended.

As the method of making an alloy of lithium and the inter-metallic compound containing any one of the 4A group elements and P and Sb, only the electro-chemical method has been described in the foregoing embodiments. In the electro-chemical method, the inter-metallic compound is electrolytically reduced in an electrolyte liquid containing lithium salt in a battery. However, metallurgical method may also be applied.

The other positive active materials which can be used are transition metal chalcogenides such as $TiS_2$, $MoS_2$ and the like and transition metal oxide compositions such as $LiMn_2O_4$, $LiNiO_2$ and the like.

The electrolytes which may be used are an organic electrolyte liquid which is made by dissolving a lithium salt, such as $LiPF_6$, $LiClO_4$, $LiAlCl_4$, $LiBF_4$, $LiAsF_4$ and so on, in at least one kind of aprotic polar organic solvent such as propylene carbonate, 2-methyl-tetrahydrofuran, dioxolene, tetra-hydrofuran, 1,2-dimethoxyethane, ethylene carbonate, y-butylo-lactone, dimethylesulfoxide, acetnitrile, formamide, dimethyl-formamide, nitro-methane and so on, or a solid electrolyte or a molten salt having lithium ions as conductive substance, or a well-known electrolyte commonly used in a battery using an alkaline metal.

As described above, it can be confirmed from this embodiment that the negative electrode is hardly damaged even with repeated charging and discharging, since the volume change of the material is small, and it can be confirmed from the result of the cycle test that the life-time of the negative electrode material of the non-aqueous secondary battery can be largely extended, that is, the life-time of the non-aqueous secondary battery can be largely extended.

[Embodiment 6]

Figure 16:
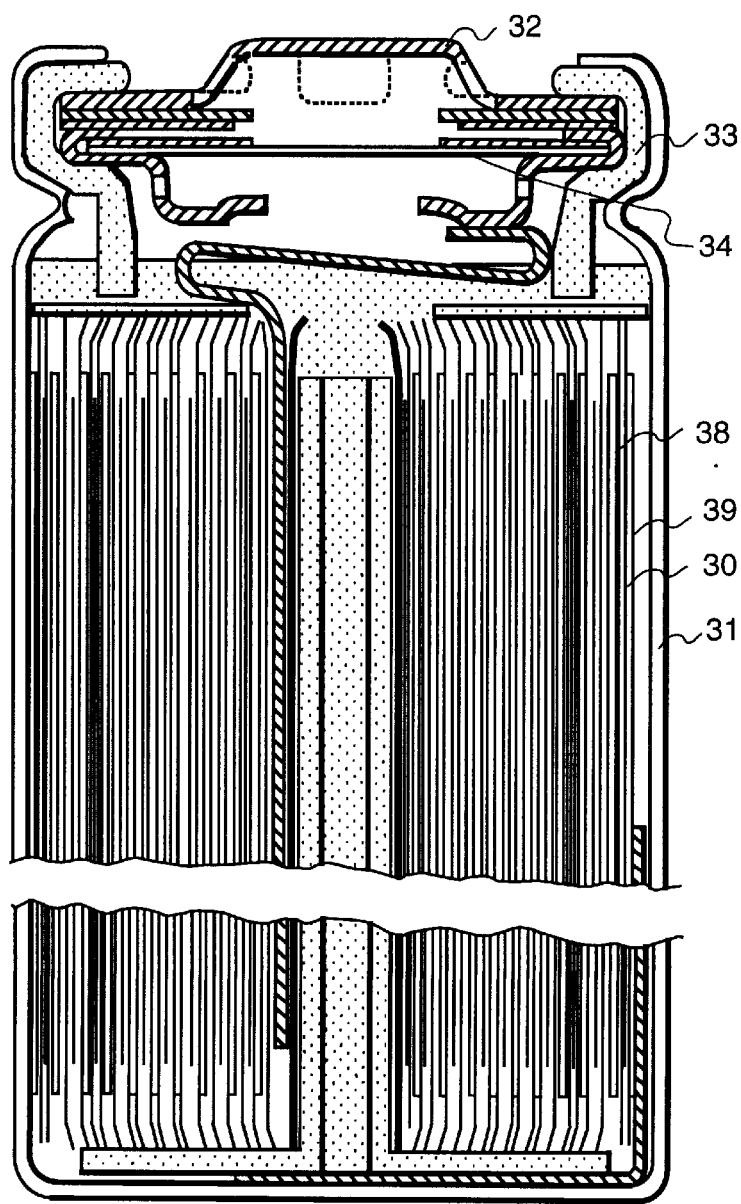
FIG. 16 is a cross-sectional view showing a cylindrical battery.

A cylindrical battery as shown in FIG. 16 was manufactured by applying the paste of the negative electrode material described in Embodiment 1 onto a copper film with a doctor blade and applying the paste made of the positive electrode material in a similar manner to the negative electrode material onto an aluminum film with a doctor blade, and interposing a propylene separator impregnated with an electrolyte between electrodes to form a rolled body.

The rolled body was contained in a battery can 31 in the form of a nickel plated steel cylinder with a bottom head serving as a negative electrode terminal. An electrolyte liquid was poured into the battery can. The electrolyte liquid was a solution containing 1 mol/liter concentration of $LiPE_6$ added to a mixture of ethylene carbonate, butylene carbonate and dimethyle carbonate in volume ratio of 2:2:6. A top head 32 with a positive electrode terminal was fixed to the battery can through a gasket 33 by crimping the battery can to form the cylindrical battery. The positive electrode terminal 32 and the battery can 31 were connected to a positive electrode sheet 38 and a negative electrode sheet 9 using lead terminals in advance, respectively. The reference character 34 indicates a safety valve.

In this embodiment, the discharging capacity was increased and the life-time was extended as in Embodiment 1.

The effects of the present invention are as follows.
(1) The discharging capacity of the negative electrode material can be increased by setting the discharging capacity of the negative electrode during a period to 1000 to 2500 mAh/cm$^3$, the period being from a time when the battery is started to be discharged at a condition of steady-state current of 0.5 mA/cm$^2$ after being charged to a time when the voltage between the negative electrode and the positive electrode becomes 1.0 V.
(2) The life-time of the negative electrode can be extended.

What is claimed is:

1. A nonaqueous secondary battery having a positive electrode and a negative electrode reversibly absorbing and discharging an alkaline metal and a nonaqueous electrolyte, wherein the discharging capacity of the negative electrode during a period is 1300 to 2500 mAh/cm$^3$, said period being from a time when the battery is started to be discharged from a condition of a steady-state current of 0.5 mA/cm$^2$ after being charged to a time when the voltage between said negative electrode and said positive electrode becomes 1.0 V.

2. A nonaqueous secondary battery having a positive electrode and a negative electrode reversibly absorbing and discharging an alkaline metal and a nonaqueous electrolyte, wherein said negative electrode is made of an inter-metallic compound containing at least one element selected from the group consisting of 4A group elements, P and Sb, said inter-metallic compound having any one of $CaF_2$, ZnS and AlLiSi crystal structures, said $CaF_2$ structure being any one of an inverse-fluorite structure and a fluorite structure having a lattice constant larger than 6.36 Å.

3. A nonaqueous secondary battery having a positive electrode and a negative electrode reversibly absorbing and discharging an alkaline metal and a nonaqueous electrolyte, wherein said negative electrode is made of an inter-metallic compound of cubic crystal system, said inter-metallic compound having any one of $CaF_2$, ZnS and AlLiSi crystal structures, said $CaF_2$ structure being any one of an inverse-fluorite structure and a fluorite structure having a lattice constant larger than 6.36 Å.

4. A nonaqueous secondary battery having a positive electrode and a negative electrode reversibly absorbing and discharging an alkaline metal and a nonaqueous electrolyte, wherein said negative electrode is made of an inter-metallic compound, said inter-metallic compound having any one of $CaF_2$, ZnS and AlLiSi crystal structures, said $CaF_2$ structure being any one of an inverse-fluorite structure and a fluorite structure having a lattice constant larger than 6.36 Å.

5. A nonaqueous secondary battery having a positive electrode and a negative electrode reversibly absorbing and discharging an alkaline metal and a nonaqueous electrolyte, wherein said negative electrode is made of an inter-metallic compound, the space group of the crystal lattice of said inter-metallic compound being F4-3m.

6. A nonaqueous secondary battery having a positive electrode and a negative electrode reversibly absorbing and discharging an alkaline metal and a nonaqueous electrolyte, wherein said negative electrode is made of any one of inter-metallic compounds of $Mg_2Sn$, $Mg_2Pb$, $NiSi_2$, AlP, AlSb, CuMgSb, $Mg_2Ge$ and $CoSi_2$.

7. A nonaqueous secondary battery according to any one of claim 1 to claim 6, wherein said negative electrode material has a charging capacity per volume of 1000 to 3500 mAh/cm$^3$.

8. A nonaqueous secondary battery according to any one of claim 1 to claim 6, wherein said negative electrode material has a charging capacity per volume of 2200 to 3500 mAh/cm$^3$.

9. A nonaqueous secondary battery according to any one of claim 1 to claim 6, wherein said negative electrode material has a charging capacity per weight of 380 to 1400 mAh/g.

10. A negative electrode material for a nonaqueous secondary battery reversibly absorbing and discharging an alkaline metal, wherein the discharging capacity of the negative electrode during a period is 1000 to 2500 mAh/cm$^3$, said period being from a time when the battery is started to be discharged from a condition of a steady-state current of 0.5 mA/cm$^2$ after being charged to a time when the voltage between a negative electrode and a positive electrode of the battery becomes 1.0 V.

11. A negative electrode material for a nonaqueous secondary battery reversibly absorbing and discharging an alkaline metal, which is an inter-metallic compound containing at least one element selected from the group consisting of 4A group elements, P and Sb, said inter-metallic compound having any one of $CaF_2$, ZnS and AlLiSi crystal structures, said $CaF_2$ structure being any one of an inverse-fluorite structure and a fluorite structure having a lattice constant larger than 6.36 Å.

12. A negative electrode material for a nonaqueous secondary battery reversibly absorbing and discharging an alkaline metal, which is an inter-metallic compound of cubic crystal system, said inter-metallic compound having any one of $CaF_2$, ZnS and AlLiSi crystal structures, said $CaF_2$ structure being any one of an inverse-fluorite structure and a fluorite structure having a lattice constant larger than 6.36 Å.

13. A negative electrode material for a nonaqueous secondary battery reversibly absorbing and discharging an alkaline metal, which is an inter-metallic compound, said inter-metallic compound having any one of $CaF_2$, ZnS and AlLiSi crystal structures, said $CaF_2$ structure being any one of an inverse-fluorite structure and a fluorite structure having a lattice constant larger than 6.36 Å.

14. A negative electrode material for a nonaqueous secondary battery reversibly absorbing and discharging an alkaline metal, said negative electrode material being an inter-metallic compound, the space group of crystal lattice of said inter-metallic compound being F4-3m.

15. A negative electrode material for a nonaqueous secondary battery reversibly absorbing and discharging an alkaline metal, which negative electrode material is any one of inter-metallic compounds of $Mg_2Sn$, $Mg_2Pb$, $NiSi_2$, AlP, AlSb, CuMgSb, $Mg_2Ge$ and $CoSi_2$.

16. A negative electrode material for a nonaqueous secondary battery according to any one of claim 11 to claim 15, of which the charging capacity per volume is 1000 to 3500 $mAh/cm^3$.

17. A negative electrode material for a nonaqueous secondary battery according to any one of claim 11 to claim 15, of which the charging capacity per volume is 2200 to 3500 $mAh/cm^3$.

18. A negative electrode material for a nonaqueous secondary battery according to any one of claim 11 to claim 15, of which the charging capacity per weight is 380 to 1400 mAh/g.

19. A nonaqueous secondary battery according to claim 7, wherein said negative electrode material has a charging capacity per weight of 380 to 1400 mAh/g.

20. A nonaqueous secondary battery according to claim 8, wherein said negative electrode material has a charging capacity per weight of 380 to 1400 mAh/g.

21. A negative electrode material for a nonaqueous secondary battery according to claim 16, of which the charging capacity per weight is 380 to 1400 mAh/g.

22. A negative electrode material for a nonaqueous secondary battery according to claim 17, of which the charging capacity per weight is 380 to 1400 mAh/g.

23. A nonaqueous secondary battery according to claim 6, wherein the inter-metallic compound is selected from the group consisting of AlP, $Mg_2Ge$, AlSb, $Mg_2Sn$ and $Mg_2Pb$.

24. A negative electrode material according to claim 15, wherein the inter-metallic compound is selected from the group consisting of AlP, $Mg_2Ge$, AlSb, $Mg_2Sn$ and $Mg_2Pb$.

* * * * *